(12) United States Patent
Nakaya et al.

(10) Patent No.: US 8,700,779 B2
(45) Date of Patent: Apr. 15, 2014

(54) MULTI NODE SERVER SYSTEM WITH PLANE INTERCONNECTS THE INDIVIDUAL NODES EQUIDISTANTLY

(75) Inventors: Morihide Nakaya, Hadano (JP); Shisei Fujiwara, Yokohama (JP)

(73) Assignees: Hitachi, Ltd., Tokyo (JP); Hitachi Information & Telecommunication Engineering, Ltd., Kanagawa (JP)

( * ) Notice: Subject to any disclaimer, the term of this patent is extended or adjusted under 35 U.S.C. 154(b) by 0 days.

(21) Appl. No.: 12/895,085

(22) Filed: Sep. 30, 2010

(65) Prior Publication Data

US 2011/0016201 A1    Jan. 20, 2011

Related U.S. Application Data

(62) Division of application No. 11/227,112, filed on Sep. 16, 2005, now Pat. No. 7,840,675.

(30) Foreign Application Priority Data

Dec. 9, 2004   (JP) .................................. 2004-356157
Apr. 28, 2005  (JP) .................................. 2005-130746

(51) Int. Cl.
*G06F 15/173*   (2006.01)
(52) U.S. Cl.
USPC ........................ 709/226; 709/220; 361/679.02
(58) Field of Classification Search
USPC ............................... 709/220, 226; 361/679.02
See application file for complete search history.

(56) References Cited

U.S. PATENT DOCUMENTS

| | | | | |
|---|---|---|---|---|
| 5,335,335 A | * | 8/1994 | Jackson et al. | 711/121 |
| 5,602,850 A | * | 2/1997 | Wilkinson et al. | 370/402 |
| 5,774,698 A | * | 6/1998 | Olnowich | 712/1 |
| 5,966,729 A | * | 10/1999 | Phelps | 711/146 |
| 6,055,599 A | * | 4/2000 | Han et al. | 710/317 |
| 6,144,675 A | | 11/2000 | Wakabayashi et al. | |
| 6,239,985 B1 | | 5/2001 | Feraud et al. | |
| 6,467,012 B1 | * | 10/2002 | Alvarez et al. | 710/316 |
| 6,690,584 B2 | | 2/2004 | Uzuka et al. | |
| 7,082,601 B2 | | 7/2006 | Ohsawa et al. | |
| 7,117,388 B2 | | 10/2006 | Arimilli et al. | |
| 2002/0018339 A1 | * | 2/2002 | Uzuka et al. | 361/796 |
| 2003/0009629 A1 | * | 1/2003 | Gruner et al. | 711/130 |
| 2004/0022022 A1 | | 2/2004 | Voge | |

(Continued)

FOREIGN PATENT DOCUMENTS

| | | |
|---|---|---|
| EP | 0 334 496 | 9/1989 |
| JP | 2-21351 | 1/1990 |

(Continued)

*Primary Examiner* — Harunur Rashid
(74) *Attorney, Agent, or Firm* — Mattingly & Malur, PC

(57) ABSTRACT

A server system has, in addition to extensibility of scale-out type of a braid server system, extensibility of scale-up type by making SMP coupling among nodes. Each node has a unit for SMP coupling to other nodes. A module management unit responds to system configuration information to switch between a mode in which the node operates singularly as a braid server and a mode in which the node operates as a constituent module of an SMP server. Links among individual nodes are laid through equidistant wiring lines on a back plane and additionally a loop wiring line having a length equal to that of the inter-node link on the back plane is also laid in each node, thereby setting up synchronization among the nodes. Synchronization of reference clocks for SMP coupled nodes is also established.

7 Claims, 11 Drawing Sheets

(56) References Cited

U.S. PATENT DOCUMENTS

| | | |
|---|---|---|
| 2004/0030774 A1 | 2/2004 | Espinosa-Ibarra |
| 2004/0068623 A1* | 4/2004 | Augsburg et al. .............. 711/146 |
| 2004/0193809 A1* | 9/2004 | Dieffenderfer et al. ....... 711/146 |

FOREIGN PATENT DOCUMENTS

| | | | | |
|---|---|---|---|---|
| JP | 5-341872 | 12/1993 | | |
| JP | 6-334369 | 12/1994 | | |
| JP | 10-269169 | 10/1998 | | |
| JP | 2001186180 | * 7/2001 | ............... | H04I 12/56 |
| JP | 2001-256179 | 9/2001 | | |
| JP | 2002-57419 | 2/2002 | | |
| JP | 2003-30050 A | 1/2003 | | |
| JP | 2003-216595 | 7/2003 | | |
| JP | 2004-70954 | 3/2004 | | |
| JP | 2004-78930 | 3/2004 | | |
| JP | 2004-110791 | 4/2004 | | |
| JP | 2004-326809 | 11/2004 | | |

* cited by examiner

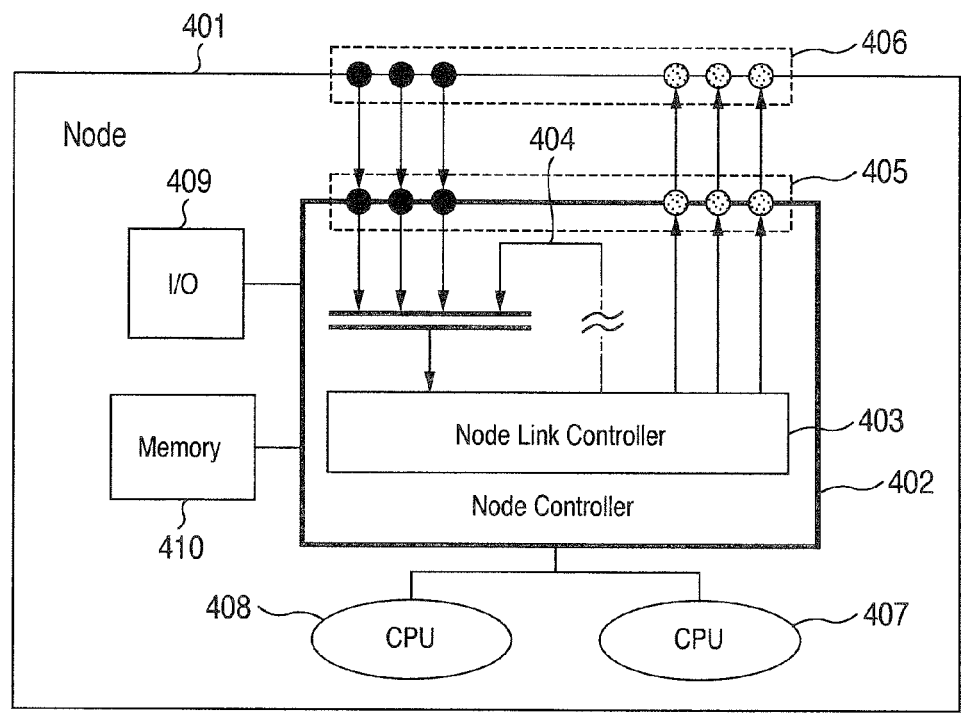
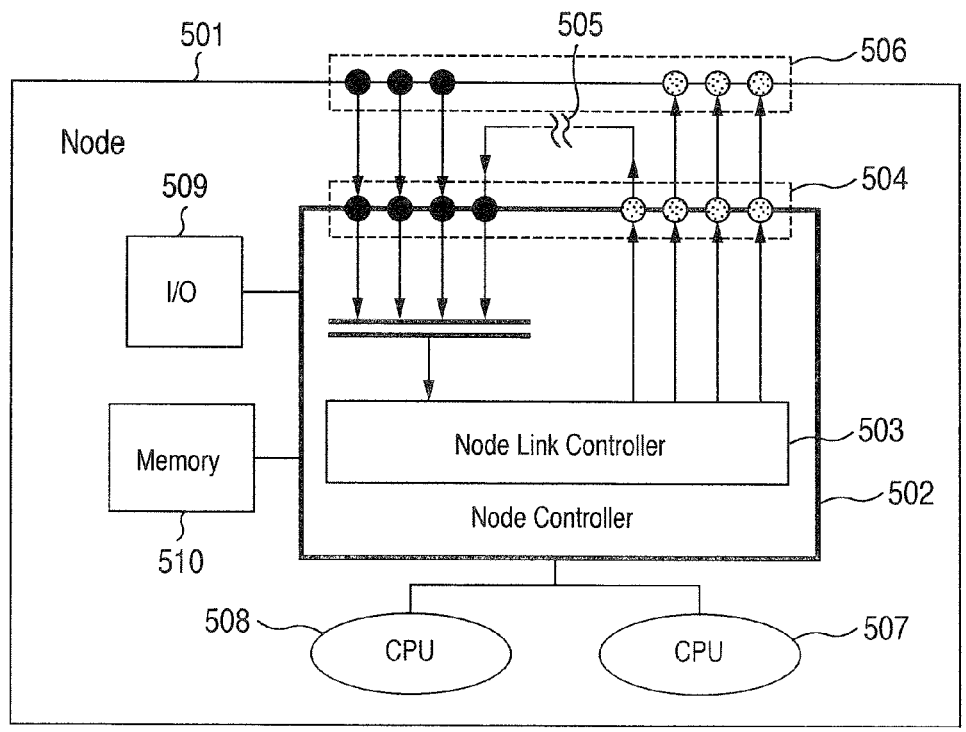

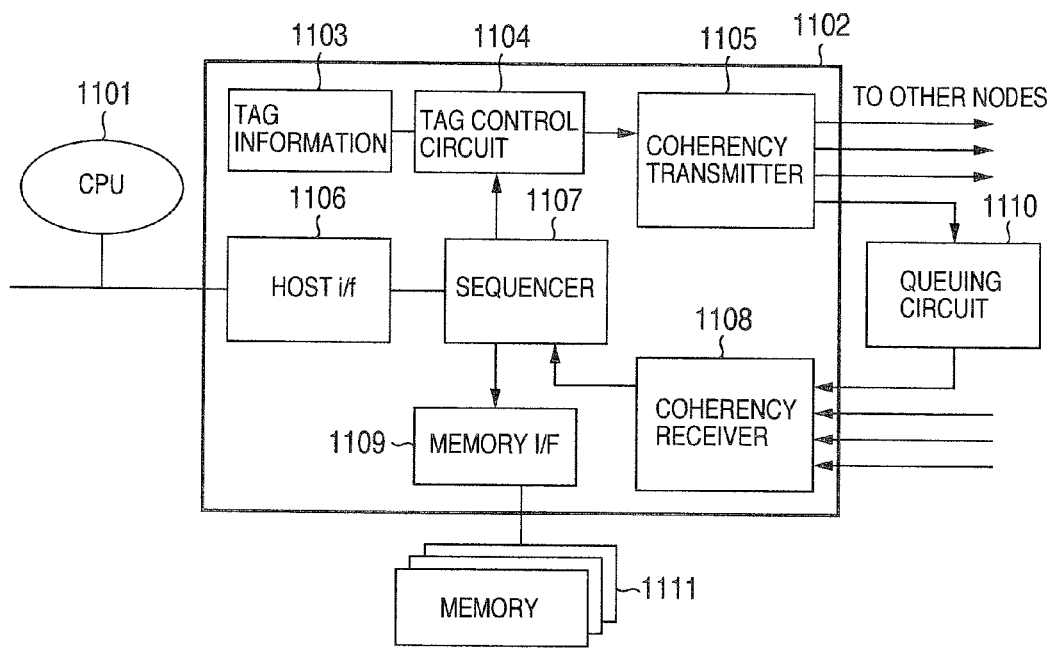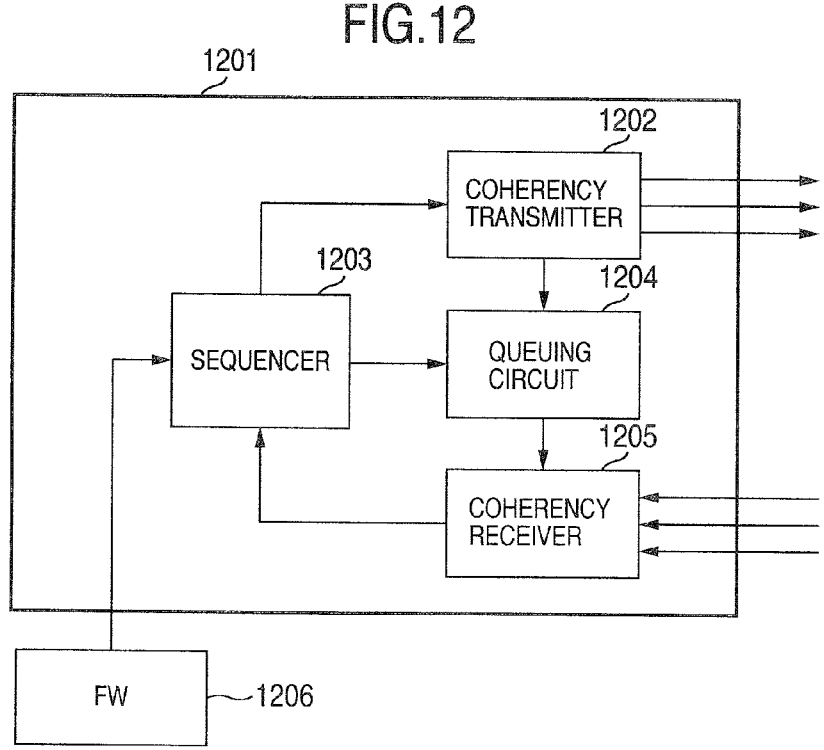

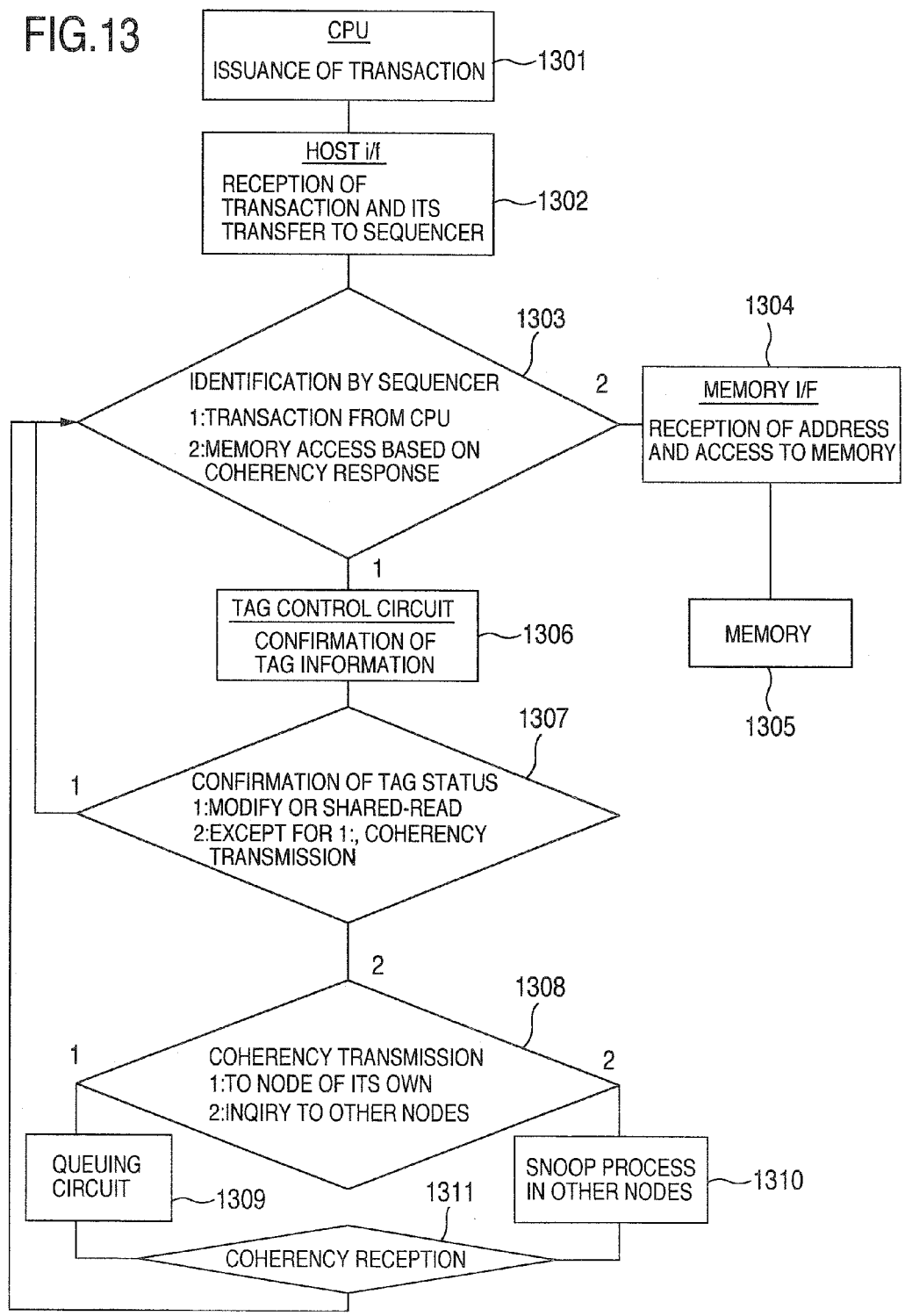

FIG.16

(1) 2-NODES SMP CONFIGURATION ×1, 1-NODE BRAID CONFIGURATION ×2

| NODE # | OPERATION MODE | HEAD NODE # | SMP NODE NUMBER | MEMORY ADDRESS AREA |
|---|---|---|---|---|
| 0 | 1 | 0 | 2 | 0 ~ 2G |
| 1 | 1 | 0 | 2 | 2 ~ 4G |
| 2 | 0 | 2 | 0 | 0 ~ 2G |
| 3 | 0 | 3 | 0 | 0 ~ 2G |

(2) 2-NODES SMP CONFIGURATION ×2

| NODE # | OPERATION MODE | HEAD NODE # | SMP NODE NUMBER | MEMORY ADDRESS AREA |
|---|---|---|---|---|
| 0 | 1 | 0 | 2 | 0 ~ 2G |
| 1 | 1 | 0 | 2 | 2 ~ 4G |
| 2 | 1 | 2 | 2 | 0 ~ 2G |
| 3 | 1 | 2 | 2 | 2 ~ 4G |

(3) 1-NODE BRAID CONFIGURATION ×4

| NODE # | OPERATION MODE | HEAD NODE # | SMP NODE NUMBER | MEMORY ADDRESS AREA |
|---|---|---|---|---|
| 0 | 0 | 0 | 0 | 0 ~ 2G |
| 1 | 0 | 1 | 0 | 0 ~ 2G |
| 2 | 0 | 2 | 0 | 0 ~ 2G |
| 3 | 0 | 3 | 0 | 0 ~ 2G |

(4) 4-NODES SMP CONFIGURATION ×1

| NODE # | OPERATION MODE | HEAD NODE # | SMP NODE NUMBER | MEMORY ADDRESS AREA |
|---|---|---|---|---|
| 0 | 1 | 0 | 4 | 0 ~ 2G |
| 1 | 1 | 0 | 4 | 2 ~ 4G |
| 2 | 1 | 0 | 4 | 4 ~ 6G |
| 3 | 1 | 0 | 4 | 6 ~ 8G |

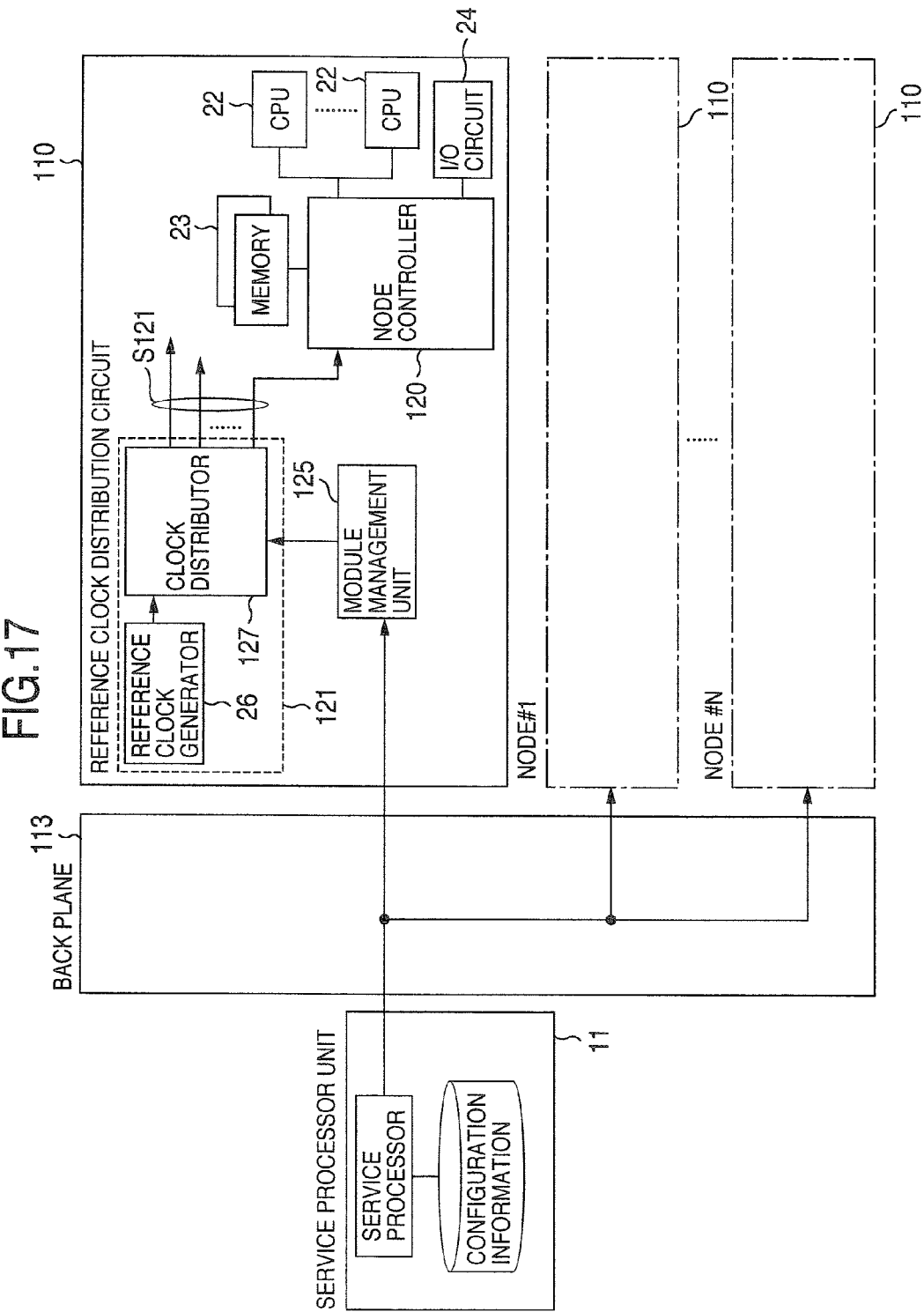

MULTI NODE SERVER SYSTEM WITH PLANE INTERCONNECTS THE INDIVIDUAL NODES EQUIDISTANTLY

This is a divisional application of U.S. application Ser. No. 11/227,112, filed Sep. 16, 2005, which claims priority to JP 2004-356157, filed Dec. 9, 2004, and JP 2005-130746, filed Apr. 28, 2005, the contents of which are hereby incorporated by reference into this application.

BACKGROUND OF THE INVENTION

The present invention relates to a multi node server system capable of structuring a scaleup type server by intimately coupling a plurality of scale-out type server modules (also called nodes) and more particularly, to a multi node SMP (Symmetrical Multi Processor) structure.

The means for expanding the operation throughput in a conventional server system can be classified into two major types called "scale-out" and "scaleup". A scale-out system as represented by a braid server system signifies an expanding architecture adapted to improve the total throughput by distributing transactions to a plurality of server systems and is effective to deal with a large number of transactions which are less correlated to each other. A scaleup system as represented by a SMP system signifies an expanding architecture adapted to improve the throughput of a unity of server system by increasing the speed and number of processors and the capacity of memories as well and is effective to deal with a highly loaded, single process. Since the braid server system and SMP server system have different features, it is general to select suitable one of them in accordance with applications and line of business in structuring a system. In effect, in an Internet data center (IDC), the braid server system suitable for scale-out is selectively used as a WEB server which executes a large number of relatively light loaded transactions such as WEB front end transactions and the SMP server system suitable for scaleup is selectively used as a data server which executes a transaction representative of, for example, a large-scale DB requiring a large number of memories. Seemingly, such a selective use as above meets, so to speak, putting the right man in the right place and is very efficient but because of purposive placement of dedicated or exclusive server systems, the management becomes sophisticated and the aforementioned selective use can hardly be said to be highly efficient from the standpoint of running costs. As known measures to cope with rapid changes in system requirements in the bewilderingly changing business environment, an expedient of increasing the number of hardware will first be enumerated. For example, in the case of the braid server system of scale-out type, this can be accomplished by increasing the number of braid server modules and in the case of the SMP server system of scaleup type, with a view to attaining this purpose, hardware resources such as processors and memories are increased in number or they are reinforced to high-performance ones, giving however rise to one cause of preventing reduction in the TCO (total cost of management).

In order to make a multi node SMP structure in a server system comprised of a plurality of nodes, it is necessary that data be transferred in a unit of block sized to a cache line by transmitting a memory address between nodes and maintaining the cache coherency. A processor of each node has a cache memory having the custody of a data block used frequently. The general cache size is 32, 64 or 128 bytes and is called a cache line. In the absence of necessary data in the cache (cache miss), the processor asks another processor for the necessary data. If a modified copy of a requested block is neither in any processor nor in an input/output controller, the block is taken out of a memory. For the sake of obtaining permission to change a block, a processor which has taken out the block from the memory must behave as a possessor of the block. When the processor having obtained the permission to change becomes a new possessor, all other devices make invalid copies they hold and the former possessor transfers to the new possessor the data the processor in possession of permission to change has requested. Following transfer of the data the processor in possession of permission to change has requested from the former possessor to the new possessor, when a different processor wants to share a read only copy of the data the processor in possession has requested, the data is offered from the device in possession thereof (not the memory). As the processor in possession needs a space area of the cache for the purpose of writing new data, it writes the cache block in the memory and the memory again becomes a possessor. A process for finding out the latest copy of a cache block is called "cache coherency". By principally using two methods of broadcast coherency and directory coherency, a system designer maintains consistency of the memory as viewed from the individual processors.

In the broadcast coherency, all addresses are transmitted to all nodes. Each device examines in what condition a requested cache line is placed in a local cache (executes snoop). In the system, since the total snoop result is determined several cycles after each device has examined in what condition the requested cache line is placed in the local cache, the delay can be suppressed to a minimum in the broadcast coherency.

In the directory coherency, responsive to an access request from a processor, an address is transmitted to only a node (home node) having the custody of an address of a special cache block. By using a directory in the memory, a special RAM or a controller, the hardware manages which one of cache blocks which one of nodes shares or possesses. The "directory" is embedded in the memory and therefore, in principle, the controller must access the memory at the time of each access request to check directory information, with the result that the protocol becomes sophisticated and consequently the delay is prolonged and changes largely.

With the aim of realizing a multi node SMP structure, a crossbar switch is generally used in controlling the cache coherency among many nodes. But, a transaction must pass through the crossbar switch and as compared to absence of the crossbar switch, one device is additionally inserted in a path through which the transaction must pass, leading to a problem that the latency is degraded. Gathering from a round path of a requesting system transaction and a responding system transaction, the latency differs to a great extent for the case of the use of crossbar switch and the case of nonuse thereof.

At present, a multi node SMP structure without any crossbar switch is available but the SMP structure on the directory base of directory coherency type is general and as the delay in coherency prolongs, a degradation in system performance is caused correspondingly.

In addition, as a method of directly interconnecting nodes on a back plane, an example is described in US2004/0022022A1. This reference discloses the method for directly interconnection between nodes but fails to give any clear description of what form the cache coherency is maintained in and how to process transactions.

SUMMARY OF THE INVENTION

An object of the present invention is to realize a multi node server system capable of materializing scale-out and scaleup at a time by providing a server system which can fulfill the function of a braid server module and in addition make SMP coupling among a plurality of braid server modules.

Another object of the invention is to reduce the latency in the multi node SMP structure.

Still another object of the invention is to reduce the number of parts in the system so as to decrease costs, fault occurrence rate and resources in the multi node SMP structure.

According to the present invention, in a server system comprising a plurality of nodes and a management unit for managing the whole of the system, each node includes a module management unit for switching the operation mode of the node, wherein the module management unit responds to configuration information transmitted from the management unit to perform switching between the mode in which each node operates singularly and the mode in which each node operates cooperatively with other nodes in a SMP structure.

According to the invention, a server system of SMP structure having a plurality of nodes comprises a back plane for mounting the plurality of nodes and interconnecting the individual nodes, wherein each node includes a node controller for performing transmission and reception of transactions among all nodes inclusive of its own node vis-à-vis therewith, and the node controller ranks the sequence of transactions.

The present invention further features that links among individual nodes on the back plane are wired equidistantly and even in the individual nodes, a link vis-à-vis therewith is wired equidistantly to the links among the individual nodes on the back plane to thereby set up synchronization among the nodes.

Further, according to this invention, in a server system comprising a plurality of nodes, a management unit for managing the whole of the system and a reference clock distribution unit for distributing a common reference clock to the plurality of nodes, each of the nodes includes a reference clock generation circuit for generating a reference clock of its own, a clock distributor for performing switching between the reference clock of its own generated from the reference clock generation circuit and the common reference clock distributed from the reference clock distribution unit to distribute either reference clock to each of the nodes, and a module management unit responsive to configuration information transmitted from the management unit to command the clock distributor to perform switchover to the reference clock distributed to each of the nodes.

According to this invention, a server system having, in addition to the extensibility of the scale-out type of the conventional braid server system, extensibility of the scaleup type attained by making SMP coupling among a plurality of braid server modules can be provided and by causing the server system executing applications to expand or reduce its resources flexibly in accordance with changes in business conditions after introduction of the system so as to optimize the resources, the running costs and TCO can consequently be reduced.

Further, according to this invention, any crossbar switch can be unneeded for connecting links among the nodes in the server system of multi node structure multi processor and therefore in the multi node SMP structure, the latency can be reduced to improve the performance of the system. Since the crossbar switch can be dispensed with, the number of parts can be decreased to realize reduction in the fault rate, costs and resources.

BRIEF DESCRIPTION OF THE DRAWINGS

FIG. 4 is a diagram showing another example of construction of each node in the FIG. 2 4-nodes SMP structure.

FIG. 5 is a diagram showing still another example of construction of each node in the FIG. 2 4-nodes SMP structure.

FIG. 11 is a block diagram showing an example of construction of a node controller.

FIG. 12 is a block diagram showing another example of construction of the node controller.

FIG. 13 is a flowchart of processing in the node controller.

FIG. 16 shows (1) through (4) examples of system configuration information.

FIG. 17 is a block diagram showing the configuration of a general braid server system.

DESCRIPTION OF THE EMBODIMENTS

Figure 1:
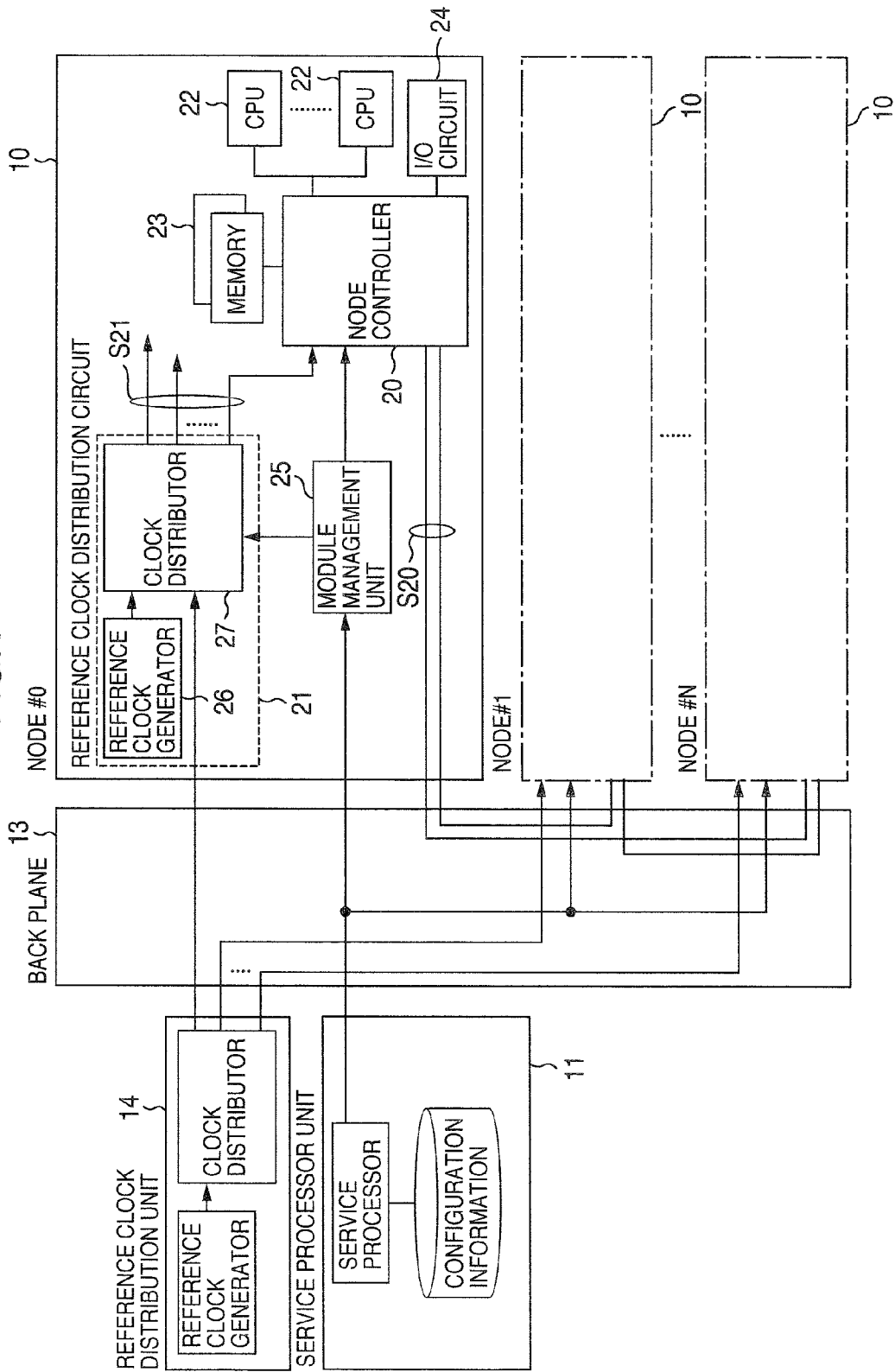
FIG. 1 is a block diagram showing an example of system configuration of a multi node server system according to the present invention.

Embodiments of the present invention will now be described with reference to the accompanying drawings.

Referring first to FIG. 17, a general, conventional braid server system is configured as illustrated therein in block diagram form. The braid server system is comprised of at least two or more braid server modules 110 (nodes #0 to node #n), a service processor unit 11 for managing the whole of the sever system, and a back plane 113 adapted to mount the units to materialize signal transmission among units. The braid server module 110 can mount at least one or more CPU's 22 and includes node controller 120 and I/O circuit 24 for controlling the CPU's 22 and a memory 23, and a module management unit 125 having the function of controlling power source inside the braid server module 110, managing the structure and monitoring environment, thus functioning as a single server system. Provided in each braid server module 110 is a reference clock distribution circuit 121 comprised of a reference clock generator 26 and a clock distributor 127. Then, a reference clock 5121 is distributed to individual LSI's which operate synchronously with each other in the braid server module 110. But, as described previously, one braid server module 110 independently acts as a single server system and this clock need not be synchronous with a reference clock in other braid server modules.

Reverting to FIG. 1, there is illustrated in block form an embodiment of a multi node server system according to the present invention. The node server system comprises a plurality of braid server modules 10 (node #0 to node #n), a service processor unit 11 for managing the whole of the server system and a back plane 13 which mounts the units to realize signal transmission among the units. The essential internal construction of each braid server module 10 is similar to that in the FIG. 17 general braid server system with the exception that a module management unit 25 has, in addition to the aforementioned function, the function of switching the reference clock. Further, a node controller 20 has a SMP coupling interface S20 and functions to materialize a multi node SMP structure by way of the back plane 13.

Figure 2:
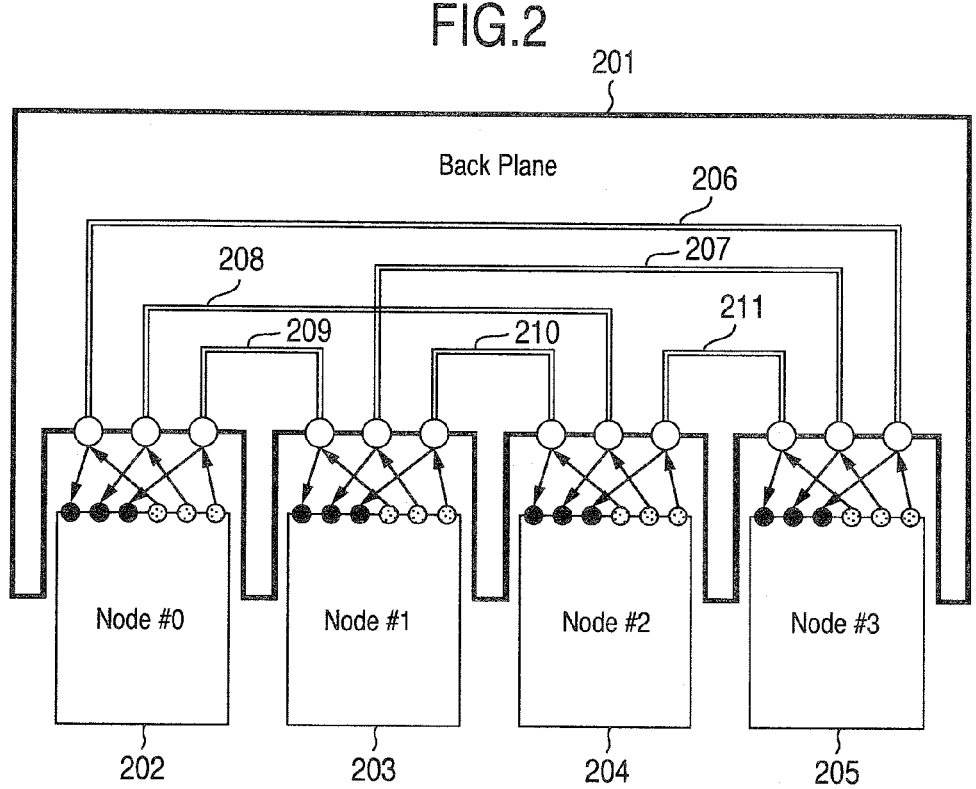
FIG. 2 is a diagram showing an example of 4-nodes structure of a multi node SMP server according to the invention.

Turning to FIG. 2, there is illustrated an example of structure of a multi node SMP server based on the broadcast type devoid of the crossbar switch according to the present invention. Exemplified in the figure is a 4-nodes structure.

Figure 8:
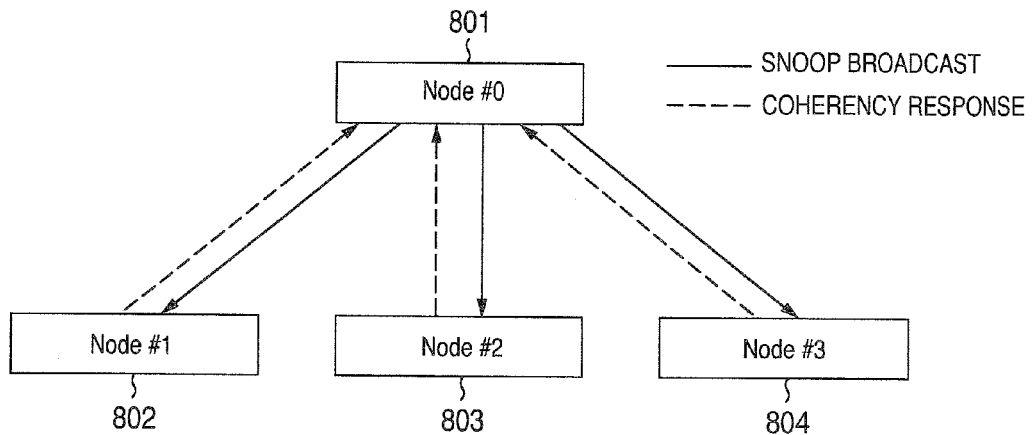
FIG. 8 is a diagram useful to explain broadcast and coherency response in the 4-nodes SMP structure.

In broadcast coherency, all addresses are broadcast to all nodes as shown in FIG. 8 and the individual nodes make a coherency response. Several cycles after examining in what condition a requested cache line is placed in a local cache, each node determines the total snoop result and makes a coherency response.

Figure 9:
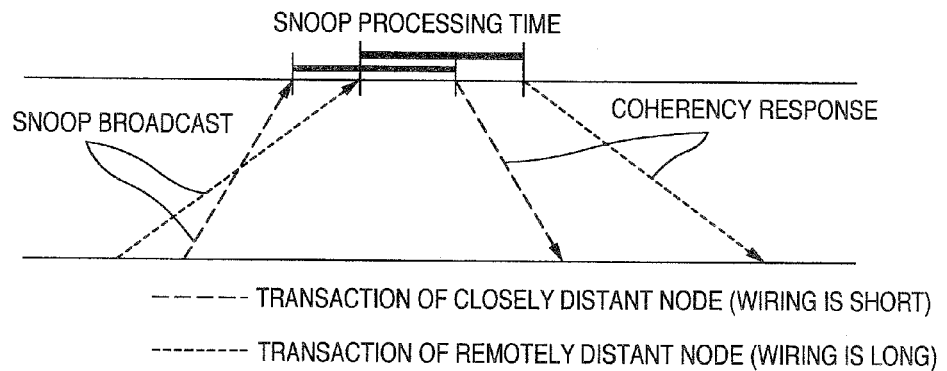
FIG. 9 is a diagram useful to explain an example of outrunning of a transaction.

As shown in FIG. 9, when there are nodes which are respectively close to and remote from a node having broadcast an address, that is, there are a node having a shorter inter-node wiring line and a node having a longer inter-node wiring line, outrunning of a transaction takes place. In order to control the outrunning of a transaction attributable to the difference in inter-node wiring line, the crossbar switch is provided in general to avoid the outrunning but in the method of the present invention has no crossbar switch and faces a problem of how the sequence of transactions can be ranked. To cope with this problem, individual links 206 to 211 among individual nodes are wired equidistantly in a back plane 201 as shown in FIG. 2 to assure equality of cycle, so that the latency can be kept to be constant and synchronization among nodes can be set up or established.

Figure 10:
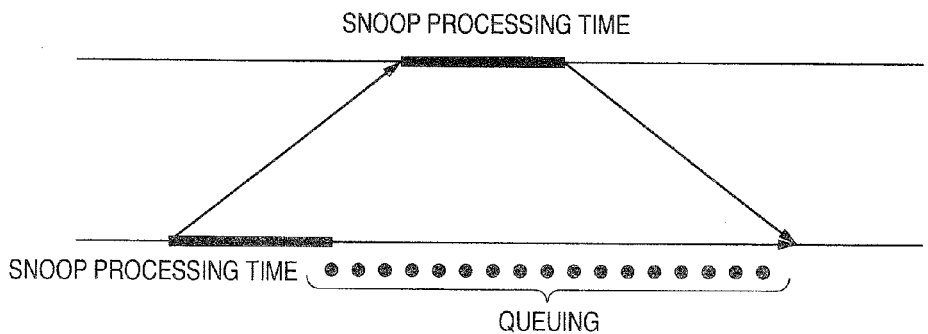
FIG. 10 is a diagram useful to explain synchronization of transaction response using a queuing circuit.

On the other hand, in the case of a node broadcasting an address and making coherency response to its own node as shown in FIG. 10, there is no need for the response to pass through any inter-node wiring line, dispensing with time to migrate through nodes. As a result, the coherency response becomes faster than that of a different node to which a request for transaction is made and hence outrunning of transaction takes place. In order to control the outrunning attributable to absence of the time to migrate through nodes, a queuing circuit is packaged in the node controller.

Referring to FIG. 11, a node controller 1102 is constructed as illustrated therein in block form. As shown in FIG. 13, a transaction issued from a CPU 1101 is transferred to a sequencer 1107 with a HOST i/f (interface) 1106 (steps 1301 and 1302). Next, the transaction is taken over to a tag control circuit 1104 under the control of the sequencer 1107 (step 1303). The tag control circuit 1104 confirms tag information 1103 (1306) and in case Modify or Shared read holds on the cache, the program returns to the sequencer 1107 (steps 1307 and 1303) and a memory 1111 is accessed under the control of a memory i/f (interface) 1109 (steps 1304 and 1305). Unless Modify or Shared read holds on the cache, a transaction is issued from a coherency transmitter 1105 to other nodes to make an inquiry about snoop (steps 1308 and 1310). Concurrently, the transaction is sent to a queuing circuit 1110 of its own node (step 1309). A coherency receiver 1108 on node controller 1102 receives the coherency responses returning from the different nodes and the queuing circuit 1110 (step 1311).

A queuing circuit 1204 is packaged on a node controller 1201 as exemplified in FIG. 12. The coherency responses returning after completion of the snoop process in the different nodes are received by a coherency receiver 1205 on node controller 1201. The coherency responses returning at the same timing under the establishment of synchronization can exactly coincide with the timing, timed to a delay by the queuing circuit 1204, of the coherency response to its own node. The transactions received by the coherency receiver 1205 are taken over to a sequencer 1203 so as to access the memory 1111 under the control of the memory i/f 1109.

As will be seen from the circuit shown in FIG. 12, upon server start, the CPU causes firmware 1206 to once calculate, prior to the server start, response times from individual nodes representing transaction request destinations and a time necessary for a response time routed through the queuing circuit of its own node. On the basis of the thus calculated times consumed in the responses, the firmware 1206 adjusts the response times. Synchronization can be set up among the nodes by making equidistant the wiring lines among the individual nodes, packaging the queuing circuit (loop wiring) in the node controller and causing the firmware 1206 to adjust the response times. With synchronization set up among the nodes, the response to the broadcast address available after decision of the snoop result can be constant to guarantee that the sequence of selection of transactions can always remain unchanged. It is to be noted that when the individual nodes operate as independent braid servers, the broadcast shown in FIG. 8 does not occur.

Figure 3:
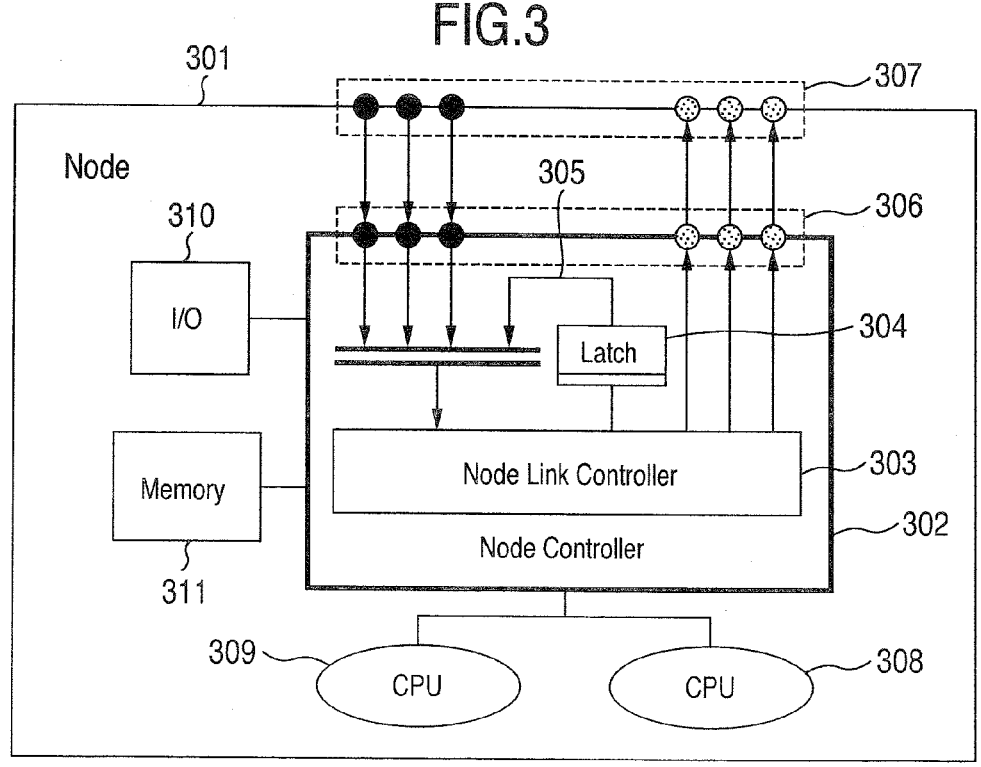
FIG. 3 is a diagram showing an example of construction of each node in the FIG. 2 4-nodes SMP structure.

Reverting to FIG. 3, an example of construction of each node in the 4-nodes structure of multi node SMP server is illustrated in block diagram form. Established on a node 301 is an inter-node coupling interface 307 for coupling a plurality of nodes to constitute a single SMP. Further, a node link controller 303 is packaged on a node controller 302. By laying a node link controller interface 306 on the node controller 302 to connect node controllers in one to one relation by means of the node link controller interfaces 306 of the individual nodes, a SMP structure is materialized. The node link controller interface 306 cooperates with the node link controller 303 internal of the node controller to play the role of a crossbar switch. By laying a local loop wiring line 305 extending from the node link controller 303 and terminating in the same with intervention of a latch 304, a response on this line can be timed to responses from the individual nodes, so that synchronization can be set up among all nodes to permit operation at the same frequency and the latency can be kept to be constant, thus realizing the function of making the response on the local loop wiring line timed to transaction responses. Through this function of making coincidence with the timings of transactions, the sequence ranking of transactions can be guaranteed.

The node controller 302 has the transaction transmission and reception functions which are independent of each other and can therefore carry out transmission and reception of transactions in parallel. The node link controller 303 broadcasts coherency transactions to all nodes in the same sequence. The node controller 302 having the node link controller interface 306 transfers coherency transactions received from the individual nodes to the interior of the node controller in the same sequence. The node link controller interface 306 has the function to perform inter-node transfer of broadcast transactions, the function to perform inter-node transfer of coherency response transactions and the function to perform inter-node transfer of one to one transactions. Transactions flowing through the node link are protected by ECC (Error Correction Coding).

The broadcast transaction is sorted into a request system transaction and a response system transaction. The interior of the node controller 302 having the node link controller interface 306 and node link controller 303 is made to be duplex for the request system transaction and response system transaction but on the node link, the request system transaction and response system transaction are transported indistinguishably. The one to one transaction is classified into an address transaction and a data transaction. Internally of the node controller 302, the one to one transaction is made to be duplex for the address transaction and data transaction but on the node link, an address transaction and data contained in a corresponding data transaction are transported consecutively.

In each node, the node controller has a calculation circuit for calculating how many cycles are consumed for transportation on the link and the difference in cycle between links calculated through the calculation is informed to the firmware of each node, thereby enabling the firmware to correct synchronization of the cycle number among the individual nodes. In addition to the equality of wiring length, the difference between the links are eliminated absolutely, so that constancy of snoop for the broadcast addresses can be guaranteed and the function of making coincidence with timings of transaction responses can be realized, thereby guaranteeing the sequence ranking of transactions.

Even when the synchronization between nodes is set up, the response timing will shift depending on the status of queuing in the node controller. To avoid this inconvenience, a node having tolerance is caused, under the control of the firmware, to wait for processing of a node which is time-consuming for response and steady consistency of the selection sequence of transactions can be guaranteed.

Another example of construction of each node in the 4-node structure is illustrated in FIG. 4. By providing the back plane 201 as shown in FIG. 2 in which the inter-node wiring lines are made to be equidistant and making the length of a local loop 404 in FIG. 4 inside a node controller 402 equal to the equidistant inter-node wiring lines inside the back plane shown in FIG. 2, the function of making a response on the local loop timing in sync to transaction responses from the individual nodes can be materialized. With this construction, a SMP structure based on the snoop of "broadcast (snoopy) coherency" type dispensing with any crossbar switch can be realized.

Still another example of construction of each node in the 4-nodes structure is illustrated in FIG. 5. By using the back plane 201 shown in FIG. 2 in which the inter-node wiring lines are made to be equidistant and a node link interface as shown in FIG. 5, a SMP structure based on the snoop of "broadcast (snoopy) coherency" dispensing with any crossbar switch can also realized. On a node controller 502 shown in FIG. 5, an inter-node coupling interface 506 is packaged having (node number-1) link ports each having the function of transmitting a data transfer transaction to other nodes and (node number-1) link ports each having the function of receiving the data transfer transaction to other nodes and in addition thereto, a node link controller interface 505 is packaged having a link port for transmission of a data transfer transaction to a local loop of its own node issuing a transaction request and a link port for reception of the data transfer transaction. Since the transaction transmitting function and receiving function of the node controller 502 are independent of each other, the node controller can perform processes of transmission and reception of transactions in parallel. By laying, on the path 505 on the node outgoing from the node link controller interface 504, a wiring line having a length equal to an inter-link length for the purpose of playing the role of delay, the function of making coincidence with transaction responses from the individual nodes can be realized.

Figure 6:
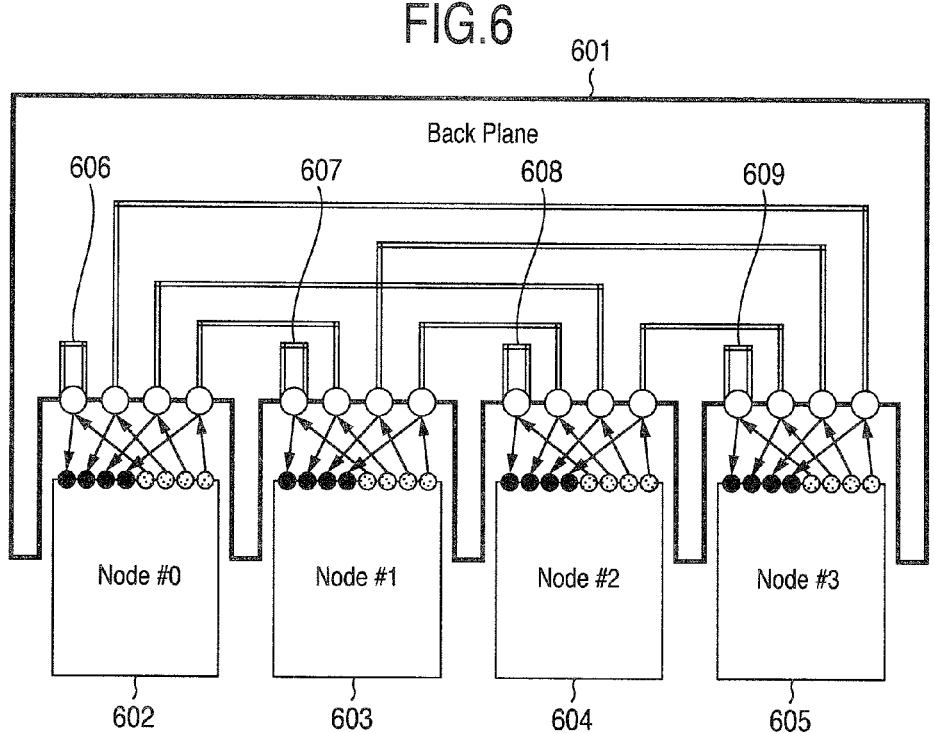
FIG. 6 is a diagram showing another example of 4-nodes structure in the multi node SMP server of the invention.
Figure 7:
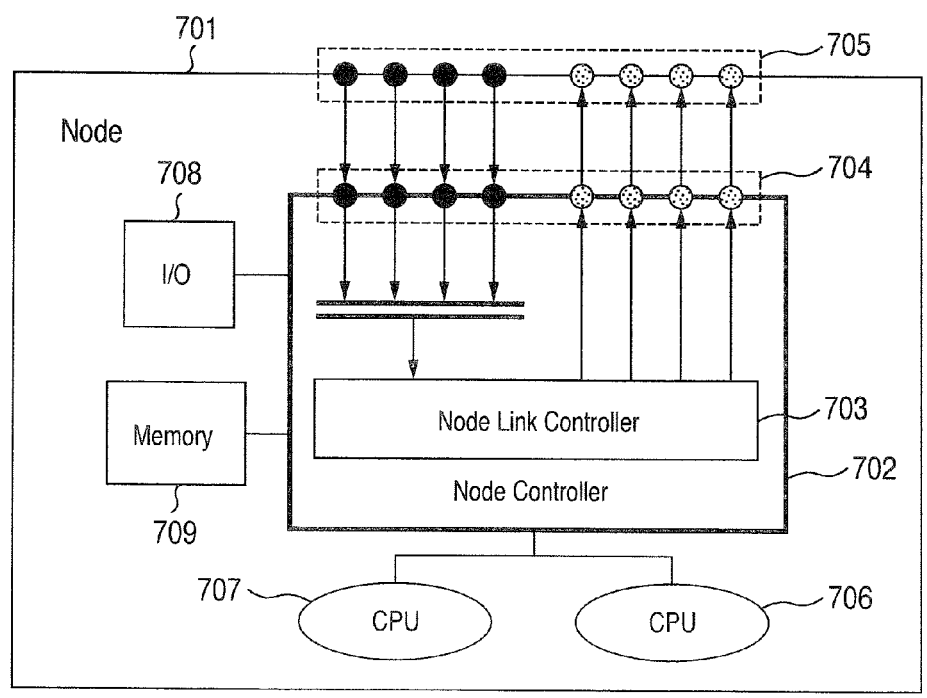
FIG. 7 is a diagram showing an example of construction of each node in the FIG. 6 4-nodes SMP structure.

Still another example of construction of each node in the 4-nodes structure is illustrated in FIG. 6. In addition to the equidistant wiring lines among individual nodes in the back plane 201 shown in FIG. 2, loop wiring lines 606 to 609 vis-à-vis with its own node each having the same length as the equidistant wiring lines among the individual nodes are laid to a node of its own in a back plane 601 as shown in FIG. 6 to thereby make timings of transaction responses uniform. In this case, as shown in FIG. 7, by preparing node link ports of transmitter and receiver of data request transactions in a node controller 702 by only the number of nodes, there is no need of laying a loop wiring line with intervention of a latch and a loop wiring line equidistant to inter-node wiring lines in the node controller in association with an inter-node coupling interface 705.

According to the present invention, in a server system of a multi node structure multi processor, the braid server using individual nodes as server braids adopts an inter-node link connection scheme in which the sequence of data transfer transactions is ranked internally of the node controller without requiring any externally provided crossbar switch and it can increase the number of processors or independent servers installed in the symmetrical type multi processor structure.

Since in FIG. 1 setting up of synchronization of the reference clock among the server modules is indispensable for achieving higher performance of SMP coupling among braid server modules 10 (node #0 to node #n), a reference clock distribution unit 14 capable of distributing the reference clock to all of the braid server modules 10 is mounted to the back plane 13, the wiring lines for the distributed reference clock are made to be equidistant in the back plane 13 and the reference clock is switched by means of a clock distributor 27 in the reference clock distribution circuit 21 provided internally of each braid server module 10, thus making realizable the synchronization of reference clock in all braid server modules 10.

Figure 14:
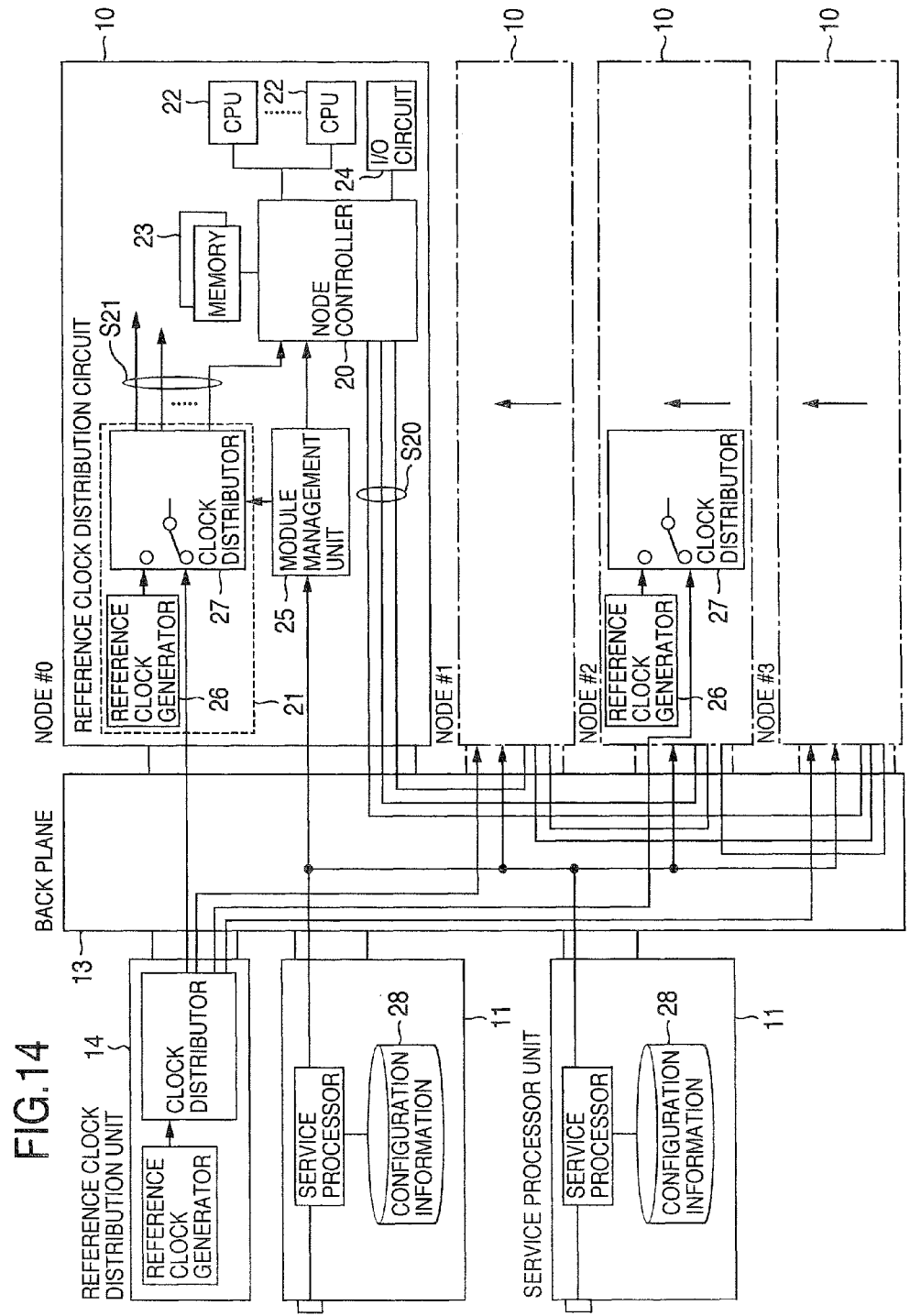
FIG. 14 is a block diagram showing details of the FIG. 1 system configuration.

Referring now to FIG. 14, the aforementioned clock switching operation will be described concretely by way of an example of a typical system configuration. In the system configuration exemplified herein, 4 braid server modules 10 (node #0 to node #3) are mounted to a back plate 13 and the nodes #0 and node "1 are cooperatively used as a single SMP server whereas the nodes #2 and #3 are used as independent braid servers, respectively. Firstly, a user sets system configuration information corresponding to the present system configuration to a service processor unit 11 by way of management software. The system configuration information set now is stored in a memory 28 the service processor unit 11 incorporates in order for the information not to be erased even when the power source is turned off and each time the system is started, the information is transmitted from the service processor unit 11 to module management units (firmware) 25 in the individual braid server modules 10. Each of the module management units 25 commands a reference clock distribution circuit 21 to switch the reference clock to be used in accordance with the configuration information transmitted from the service processor unit 11. In the present example, the reference clocks for node #0 and node #1 are switched to the external reference clock to synchronize the reference clocks for the nodes #0 and #1 with each other to constitute a SMP server whereas the reference clocks for the nodes #2 and #3 are switched to the internal reference clock to enable the nodes #2 and #3 to operate as independent servers, respectively. The system configuration information concerning switching of the clocks of the individual braid server modules 10 is possessed by the memory 28 inside the service processor unit 11 and therefore, even in the event that a fault occurs in the braid server module 10 and the faulty module needs to be subjected to maintenance/exchange, no procedure for taking over the configuration information is needed to advantage. Further, by making duplex the service processor unit 11 for centralizedly managing the system configuration information as depicted in FIG. 14, reliability of the whole system can be improved.

Figure 15:
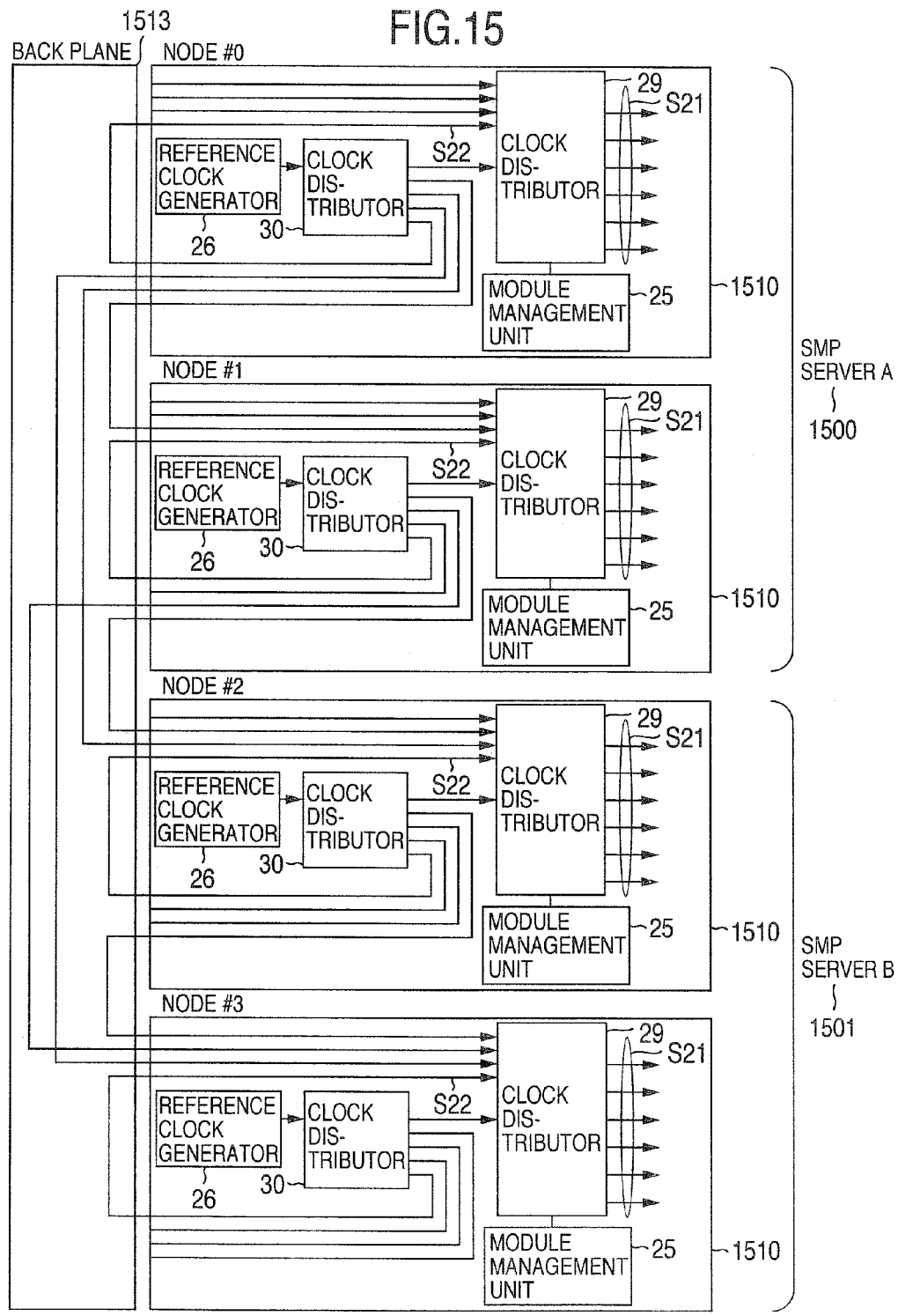
FIG. 15 is a block diagram showing another embodiment of the multi node server system according to this invention.

Turning to FIG. 15, an embodiment different from that explained with reference to FIG. 14 will be described. Excepting the function concerning the clock distribution, the FIG. 15 embodiment is identical the embodiments shown in FIGS. 1 and 14 and functional components common to these embodiments are not illustrated and will not be described. In the embodiments set forth so far, the reference clock is distributed from the reference clock distribution unit 14 to the individual braid server modules 10 as will be seen from FIGS. 1 and 14 but in the FIG. 15 embodiment, the function of the reference clock distribution unit is incorporated in a braid server module 1510. Firstly, an output clock signal of a reference clock generator 26 is inputted to a first clock distributor 30 and an output of the clock distributor connects, through equidistant wiring lines and by way of a second clock distributor 29 and a back plane 1513, to clock distributors 29 internal of all braid server modules inclusive of its own module which can constitute a SMP server cooperatively. Outputs of the second clock distributor 29 are switched with the use of a module management unit 25. For example, it is assumed that in the configuration of FIG. 15, the second clock distributor 29 on node #0 selects a clock signal S22, the second clock distributor 29 on node #1 selects a clock signal S23, the second clock distributor 29 on node #2 selects a clock signal S24 and the second clock distributor 29 on node #3 selects a clock signal S25. This makes it possible to permit the nodes #0 and #1 to constitute a single SMP server A 1500 and to permit the nodes #2 and #3 to constitute a single SMP server B 1501. It will be appreciated that in the present embodiment the reference clocks for the two SMP servers are absolutely independent of each other and therefore, coexistence of braid server modules in which the frequency of reference clock differs for the paired nodes #0 and #1 and the paired nodes #2 and #3, such as for example, coexistence of SMP servers comprised of different type braid servers or next generation braid servers can be realized in the same server system.

Examples of the system configuration information are depicted in FIG. 16. Configuration information at (1) defines a server system comprised of "2-nodes SMP structure ×1 and 1-node braid structure ×2", configuration information at (2) defines a server system comprised of "2-nodes SMP structure ×2", configuration information at (3) defines a server system comprised of "1-node braid structure ×4" and configuration information at (4) defines a server system comprised of "4-nodes SMP structure ×1". Indicated at node#1601 are node numbers determined in accordance with mount positions on the back plane. Set at operation mode 1602 is "0" when a node of interest operates singularly as a braid server or "1" when a node of interest operates as a server module of a SMP server. Set at head node#1603 is the youngest node number in a SMP structure in which a node of interest is included when the node operates as a server module of the SMP server. But if the node operates as a braid server, a node number of its own node is set at head node#1603. Set at SMP node number 1604 is the number of nodes of a SMP structure in which a node of interest is included. Set at memory address area 1605 are system address areas of a memory mounted on a node of interest.

Clock switching control corresponding to the setting of system configuration information as above will be described hereunder.

The configuration information at (1) in FIG. 16 is system configuration information corresponding to the FIG. 14 server system (2-nodes SMP structure ×1 and 1-node braid structure ×2). Since the operation mode information for the nodes #0 and #1 is "1" (SMP), the module management unit (firmware) 25 of each of the nodes #0 and #1 commands the clock distributor 27 to select a reference clock from the reference clock distribution unit 14 mounted to the back plane 13.

The operation mode information for the nodes #2 and #3 is "0" (braid) and hence, the module management unit 25 of the nodes #2 and #3 commands the clock distributor 27 to select a reference clock from the reference clock generator 26 mounted on the node of its own.

Configuration information at (2) in FIG. 16 is system configuration information corresponding to the FIG. 15 server system (2-nodes SMP structure ×2). Since the operation mode information for the nodes #0 and #1 is "1" (SMP) and the SMP node number information therefor is "2", two of the nodes #0 and #1 constitute the SMP server A 1500.

Since the head node # information for the node #0 is "0" (braid), the module management unit 25 of node #0 commands the clock distributor 29 to select a clock (S22) distributed from the clock distributor 30 of its own node.

The head node # information for the node #1 is "0" (braid) and therefore, the module management unit 25 of node #1 commands the clock distributor 29 to select a clock (S23) distributed from the node #0.

Since the operation mode information for the nodes #2 and #3 is also "1" (SMP) and the SMP node number information thereof is "2", two of the nodes #2 and #3 constitute the SMP server B 1501.

The head node # information for the node #2 is "2" and hence the module management unit 25 of node #2 commands the clock distributor 29 to select a clock (S22) distributed from the clock distributor 30 of its own node.

The head node # information for the node #3 is "2" and therefore, the module management unit 25 of node #3 commands the clock distributor 29 to select a clock (S23) distributed from the node #2.

Next, switching control of system configuration corresponding to the aforementioned setting of the system configuration information will be described.

The configuration information at (1) in FIG. 16 is system configuration information corresponding to the FIG. 14 server system (2-nodes SMP structure ×1 and 1-node braid structure ×2), the operation mode information for the nodes #0 and #1 is "1" (SMP) and the SMP node number information is "2". Therefore, the two nodes #0 and #1 constitute a SMP.

In this case, the module management unit (firmware) 25 of node #0 commands the node controller 20 to validate only the SMP coupling interface to the node #1 and to invalidate the SMP coupling interface to other nodes. The node controller 20 of node #0 electrically disconnects the SMP coupling interface S20 commanded to be invalid. In addition, since the memory address area information is "0 to 2G", the module management unit 25 of node #0 commands the node controller 20 to carry out operation at the system memory address areas "0 to 2G".

Then the module management unit 25 of node #1 commands the node controller to validate only the SMP coupling interface to the node #0 and invalidate the SMP coupling interface to other nodes. The node controller 20 of node #1 electrically disconnects the SMP coupling interface S20 commanded to be invalid. Further, since the memory address area information is "2 to 4G", the module management unit 25 of node #1 commands the node controller 20 to carry out operation at the system memory address areas "2 to 4G".

The operation mode information of node #2 is "0" (braid) and therefore, the module management unit 25 of node #2 commands the node controller 20 to invalidate all SMP coupling interfaces to other nodes. The node controller 20 of node #2 electrically disconnects all SMP coupling interfaces S20 commanded to be invalid. Further, since the memory address area information is "0 to 2G", the module management unit 25 of node #2 commands the node controller 20 to carry out operation at the system memory address areas "0 to 2G".

The operation mode information of node #3 is "0" (braid) and therefore, the module management unit 25 of node #3 commands the node controller 20 to invalidate all SMP coupling interfaces to other nodes. The node controller 20 of node #3 electrically disconnects all SMP coupling interfaces commanded to be invalid. Since the memory address area information is "0 to 2G", the module management unit 25 of node #3 commands the node controller 20 to carry out operation at the system memory address areas "0 to 2G".

Configuration information at (3) in FIG. 16 is system configuration information of a server system in which each of the 4 nodes operates as a braid server and configuration information at (4) in FIG. 16 is system configuration information of a server system of 4-nodes SMP structure. The module node management unit (firmware) of each node controls switching of clock and system configuration in accordance with each set configuration information. In this case, the contents of controlling is the same as that described previously and will not be detailed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A server system of a symmetrical multi-processor (SMP) structure comprising a plurality of nodes,
   wherein each node is connected to other nodes with a plurality of linkages, and includes a node controller having a transmitter and a receiver for performing transmission and reception of snoops among all nodes inclusive of its own node, respectively, and a queuing circuit for receiving a snoop transmitted from the transmitter from said own node and transmitting, after a predetermined time, said snoop received to the receiver of said own node,
   wherein said node controller of said node ranks the sequence of reception of snoops from all nodes inclusive of its own node,
   wherein the sequence of reception of snoops from all nodes inclusive of its own node is guaranteed to be the same among all nodes,
   wherein a plane is provided which interconnects the individual nodes with the linkages, and
   wherein said plane has wiring lines for interconnecting the individual nodes equidistantly, and each node internally has a transfer route for its own node and having the same wiring line length as that of the equidistant wiring lines for interconnecting the individual nodes in said plane.

2. The server system according to claim 1, wherein each node controller has a route for transferring said snoops to node controllers of other nodes and the node controller of its own node, and the transfer cycle among all nodes inclusive of its own node is made to be the same.

3. The server system according to claim 2, wherein each node internally has means disposed on a transfer route for its own node adapted to adjust the transfer frequency.

4. The server system according to claim 1, wherein each node controller includes means for adjusting response times of said snoops among the individual nodes inclusive of its own node.

5. The server system according to claim 1, wherein said node controller includes said queuing circuit.

6. The server system according to claim 5, wherein said node controller is a latch.

7. The server system according to claim 1, wherein the transfer route for its own node, of each node, is provided in the node controller of each node.

* * * * *